United States Patent
Beneker et al.

(10) Patent No.: US 7,740,316 B2
(45) Date of Patent: Jun. 22, 2010

(54) INTEGRATED CAR SEAT WITH LENGTHWISE ADJUSTMENT MECHANISM

(75) Inventors: Wilfried Beneker, Leichlingen (DE);
Burckhard Becker, Solingen (DE);
Jörg-Max Wölfel, Remscheid (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 363 days.

(21) Appl. No.: 11/698,525

(22) Filed: Jan. 26, 2007

(65) Prior Publication Data
US 2007/0170769 A1 Jul. 26, 2007

(30) Foreign Application Priority Data
Jan. 26, 2006 (DE) .................... 10 2006 003 966

(51) Int. Cl.
*A47C 1/02* (2006.01)
(52) U.S. Cl. .................. 297/344.13; 297/483; 297/473; 297/344.11; 297/344.12
(58) Field of Classification Search ................. 297/483, 297/473, 468, 344.11, 344.13, 354.12
See application file for complete search history.

(56) References Cited

U.S. PATENT DOCUMENTS

| | | | | |
|---|---|---|---|---|
| 4,775,126 A | * | 10/1988 | Yokoyama | ............... 248/430 |
| 5,390,982 A | | 2/1995 | Johnson et al. | |
| 5,599,070 A | | 2/1997 | Pham et al. | |
| 5,645,316 A | * | 7/1997 | Aufrere et al. | ......... 297/216.13 |
| 5,823,627 A | * | 10/1998 | Viano et al. | .................. 297/471 |
| 5,988,756 A | * | 11/1999 | Aufrere et al. | ......... 297/452.18 |
| 5,988,759 A | | 11/1999 | Bauer et al. | |
| 6,050,629 A | * | 4/2000 | Bernhardt et al. | ........ 296/65.01 |
| 6,050,635 A | * | 4/2000 | Pajon et al. | ............. 297/216.1 |
| 6,082,823 A | * | 7/2000 | Aumont et al. | .......... 297/452.2 |
| 6,299,252 B1 | * | 10/2001 | Frohnhaus et al. | .......... 297/338 |
| 6,585,325 B1 | * | 7/2003 | Pal | .............................. 297/483 |
| 7,036,878 B2 | * | 5/2006 | Masutani | ................. 297/216.1 |
| 7,086,698 B2 | * | 8/2006 | Shiraki | ....................... 297/367 |
| 7,093,901 B2 | * | 8/2006 | Yamada | ...................... 297/367 |
| 7,261,373 B2 | * | 8/2007 | Tanaka et al. | .......... 297/216.13 |
| 7,367,630 B2 | * | 5/2008 | Becker et al. | ................ 297/468 |

FOREIGN PATENT DOCUMENTS

JP 05112205 A * 5/1993

* cited by examiner

*Primary Examiner*—Laurie K Cranmer
(74) *Attorney, Agent, or Firm*—McCarter & English, LLP

(57) ABSTRACT

In the integrated car seat with a lengthwise adjustment mechanism having two pairs of rails, with a bottom support frame having two front pivotal supports, two rear pivotal supports and two side parts carried on the pivotal supports, with a seat back connected to the side parts by a seat back joint and with a seat belt buckle, the side part is configured in the shape of a shell on the seat side that is turned away from the buckle, the side part having a bottom and a perimeter profile rim. The side part turned away from the buckle is open toward the outside, the outside preferably meaning the outboard side of the seat.

27 Claims, 9 Drawing Sheets

INTEGRATED CAR SEAT WITH LENGTHWISE ADJUSTMENT MECHANISM

CROSS REFERENCE TO RELATED APPLICATIONS

This application claims priority to German Application No. DE 10 2006 003 966.1, filed Jan. 26, 2006, the contents of which are expressly incorporated by reference in their entirety as part of the present disclosure.

BACKGROUND

The invention relates to an integrated car seat with a lengthwise adjustment mechanism having two pairs of rails, with a bottom support frame having two front pivotal supports, two rear pivotal supports and two side parts carried on the pivotal supports, with a seat back connected to the side parts by a seat back joint and with a seat belt buckle.

Integrated car seats of this type are known from U.S. Pat. Nos. 5,390,982; 5,599,070 and 5,988,759 for example. In integrated car seats, the lap portion of the safety belt extends, in the usual way, from a buckle to a fixation on the pair of rails that is turned away from the buckle. The shoulder belt extends from the buckle to a deviation point in the region of the upper edge of the seat back and from there downward where it is connected to a part of the seat, such as a tie bar. In contrast to normal car seats, the shoulder belt is not fastened to the B column. On the integrated car seat, all the belt forces are absorbed by the bottom support frame only and transmitted to the underbody of the vehicle.

In terms of mechanics, an integrated seat must meet markedly more stringent requirements than a conventional seat. The forces introduced into the bottom support frame through the seat back in particular are much higher than hitherto since no forces are now introduced into the B column. Accordingly, many component parts of the seat must be implemented to be stronger than hitherto, so for example the side parts, the pivotal supports, and so on. The retractor too is no longer disposed on the B column but in the car seat itself.

According to prior art, the side parts are configured to be double-walled, in the shape of more or less closed boxes. The inner cavity of these boxes is not used for component parts. This box construction allows achieving high strength. But it takes much place that could otherwise be used for component parts.

This is where the invention comes to effect. Its objective is to provide for a more space-saving construction of an integrated car seat, using the material in the best possible way.

It is therefore the object of the invention to improve the integrated car seat of the type mentioned herein above in such a manner that its component parts be more easy to manufacture and occupy less space and be best adaptable to the respective forces acting thereon.

SUMMARY

According to the invention, this object is achieved by a car seat with a lengthwise adjustment mechanism comprising two pairs of rails; a bottom support frame having two front pivotal supports, two rear pivotal supports and two side parts carried on the pivotal supports; a seat back connected to the side parts by a seat back joint; and a seat belt buckle, wherein the side part on the seat side that is turned away from the buckle is configured in the shape of a shell and defines a bottom and a perimeter profile rim, and that the side part turned away from the buckle is open toward the outside and is preferably the outboard side part.

In terms of construction, the trough-shaped side parts can be devised so as to have sufficient strength. They carry the seat back so that they must take the corresponding forces. Forces generated by an accident are introduced into the lengthwise adjustment mechanism through the pivotal supports. The shell construction of the side parts makes it possible to accommodate discrete component parts in the interior of a respective one of the shells, for example at least one electric motor, manual drive units, and so on. The perimeter rim provides rigidity and ensures that the bottom will indeed absorb the forces generated during an accident and will not buckle laterally outward. The bottom may be shaped to make space for component parts for example.

Other features and advantages will become more apparent upon reviewing the appended claims and the following non restrictive description of four embodiments of the invention, given by way of example only with reference to the drawing.

DETAILED DESCRIPTION

Figure 1:
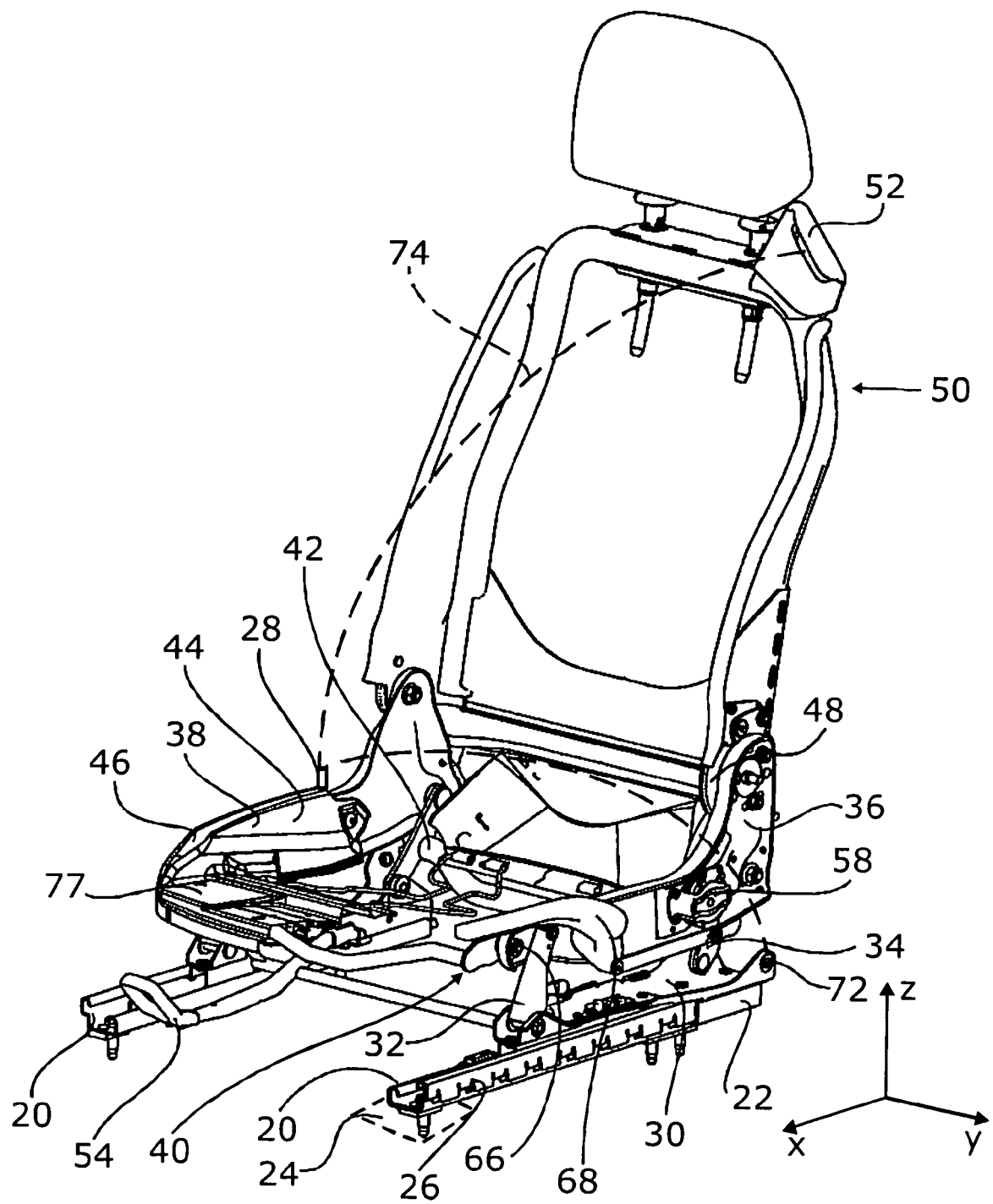
FIG. 1 is a perspective illustration in an oblique lateral view from the top of an integrated car seat, with only the essential mechanical parts being shown.
Figure 2:
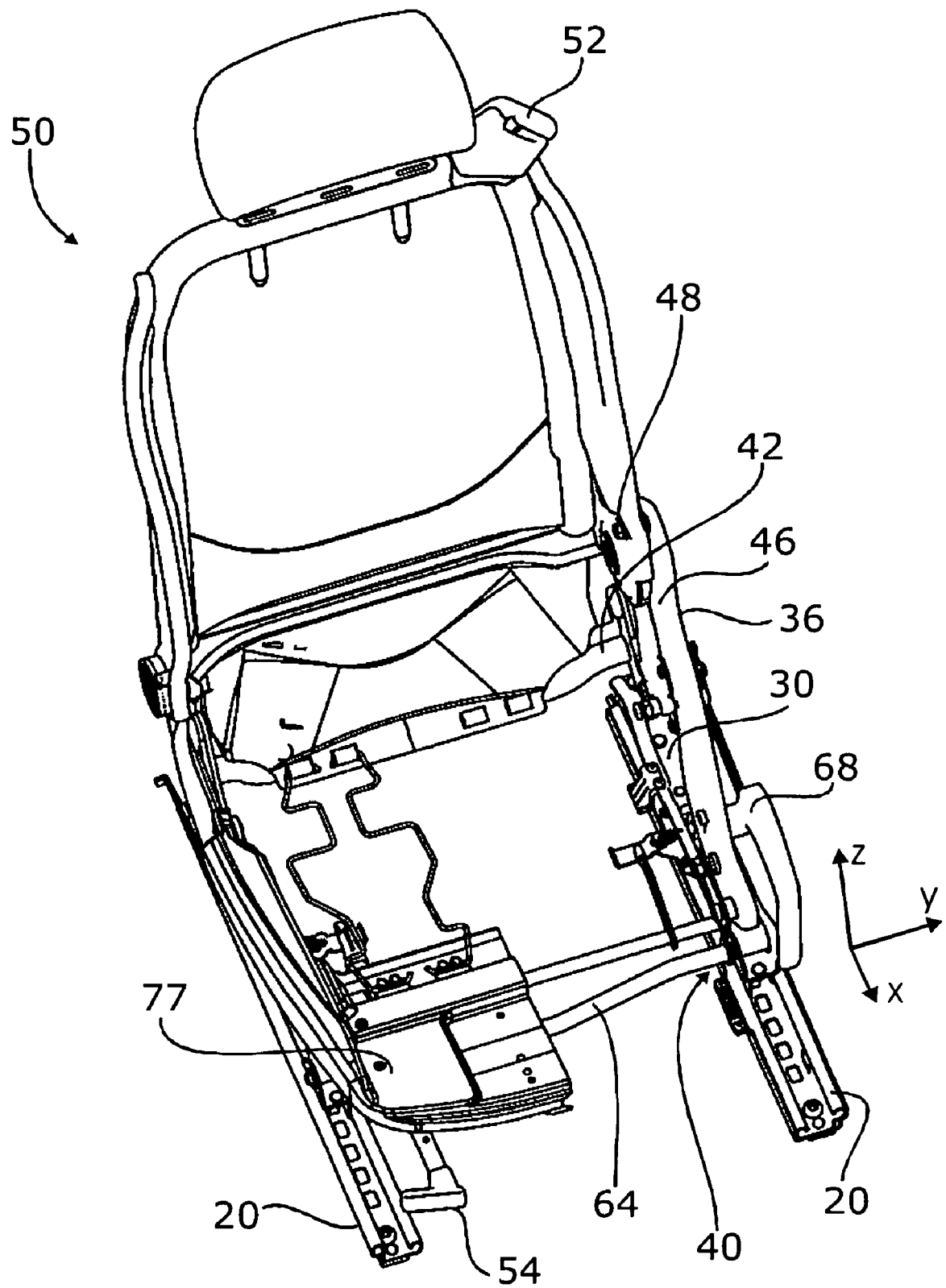
FIG. 2 is a perspective illustration of the seat shown in FIG. 1, but now in an oblique front view from the top.

The integrated car seat has a lengthwise adjustment mechanism with two pairs of rails, each having a bottom rail 20 and a seat rail 22. The bottom rails 20 are each fastened to an underbody 24 of an automotive vehicle that has not been illustrated in closer detail herein. The rails 20, 22 of each seat side are built identically. On the left seat side, which is subjected to heavier load, additional reinforcement profiles 26 are fastened to both rails 20, 22. They mesh with a play and are not noticeable in normal operation, the mutual hook features only meshing when subjected to a load occasioned by an accident. Alternatively, the rails 20, 22 may also be reinforced by additional metal sheets.

As used herein, the front is in the positive x direction, meaning in the viewing direction of a user of the motor vehicle seat. Likewise, the left is in the positive y direction, the right in the negative y direction. The top is meant to refer to the positive z direction. The outboard side of the seat usually is the side turned toward the door, at least on two-seat vehicles in which the integrated seat is a front seat. A belt buckle 28 is usually located on the inner side, meaning it is turned away from the door side.

Above the longitudinal guide there is located a bottom support frame that is carried by the longitudinal guide. On the left seat side, it has a console 30, on the right seat side, two bearing blocks performing the corresponding function. Front pivotal supports 32 and rear pivotal supports 34 project therefrom toward the top and are hinge-linked. At the top, the pivotal supports are articulated to a respective one of the side parts 36, 38. Between the left side part 36 and the right side part 38 there is a seat shell 77; it is pivotally hinge-linked to the side parts 36, 38 at the back thereof and in its front region it can be adjusted in height through an NV-adjustment device 40 so that its angular position is generally adjusted. The two rear pivotal supports 34 are united by a rear tie bar 42 so as to form a substantially H-shaped unit.

The side parts 36, 38 are in the shape of a trough. They have a bottom 44 substantially extending in a plane, namely the x-z plane. A perimeter profile rim 46 projects from the bottom 44. It points away from the belt buckle 28, this being the reason why both side parts are referred to as being open toward the left or toward the side that is turned away from the belt buckle 28. The two side parts 36, 38 are integrally made from a single sheet metal part. The profile rims 46 project about 10 to about 30 mm in the y direction. It is thereby possible that the profile rim 46 is smaller or not provided at all in the foremost region of the side parts 36, 38, in any case in front of the upper articulation point 66 of the front pivotal supports 32 since the loads acting there onto the side parts 36, 38 are small.

The left side part 36 has a markedly increased strength over the right side part 38. Preferably, the left side part is made from a metal sheet of a thickness of more than 3 mm. The metal sheet thickness of the right side part 38, by contrast, is about 2 mm. The left side part 36 is capable of absorbing forces that are at least 50%, preferably 100% higher than those the right side part 38 is able to absorb. It is preferred that the bottom is not even but formed, it is curved inward in the same direction in which the profile rim 46 projects. In the other direction, meaning in the negative y direction, it is not curved outward, meaning it remains in a plane that is defined by the corners of the profile of the side parts 36, 38.

Viewed from the side, the side parts are substantially L-shaped, the short leg of the L projecting toward the top, approximately in the z direction. In its upper region, it carries a seat back mountings 48 about the pivotal axis of which a seat back 50 is connected to the side parts 36, 38. A seat back mountings 48, which is adjustable and stoppable, is only provided on the left seat side. On the right seat side, meaning on the side of the belt buckle 28, there is only formed a passive pivotal joint. The only one seat back joint mountings 48 is implemented so as to take all the forces that are generated in the event of an accident and may act onto the seat back 50. It is substantially located beneath a belt deviation 52 that is fastened to the upper left corner of the seat back 50.

The seat back 50 has a stable U-shaped frame made from a curved strong tubular profile and is open toward the bottom. The seat back 50 further has two side cheeks that are attached outside and laterally to the legs of this U-profile and are connected transversely in the bottom region through an apron. The fastening in the region of the seat back mountings 48 or of the passive joint also occurs on these side cheeks. Since the seat back mountings 48 is only provided on one side, there is no need to provide for a shaft connecting the two sides. In an alternative, the right seat side also has an adjustable seat back mountings 48 of its own, this seat back mountings however only being capable of taking torques that are about one third of those the seat back joint mountings 48 of the left side is able to take. In this alternative, the two seat back joint mountings of a shaft are joined together for synchronization.

The two rear pivotal supports 34 are located between the side parts 36, 38. The front pivotal supports 32 are each hinged to the open side of the side parts 36, 38, meaning on the left seat side of the exemplary embodiments.

The specification refers to the seat illustrated in all the FIGS., which is a driver's seat for a left-hand-drive motor vehicle. The corresponding front passenger seat is built so as to display mirror-image symmetry across a symmetry plane lying in the x-z plane in the center of the vehicle.

The lengthwise adjustment mechanism is stopped in an actually known way by means of a manual stopping device. It has a hand lever 54 that is pivotal about a front axle synchronizing the two locking devices of the two seat sides. In the motor-driven implementation, there is provided in the inner profile space of the rails 20, 22 an arrangement consisting of a toothed rack and a pinion or of a spindle and a spindle nut, the arrangement being indicated through a first electric motor of the continuous shaft. This is prior art as well.

The height adjustment also occurs in accordance with prior art through a toothed quadrant that is connected to the left rear pivotal support 34. It meshes with a pinion that is carried in the associated side part 36. This side part is actuated through a driving device 58, for example with a clamp roller ratchet gearing. This driving device 58 is located, at least partially, in the trough-shaped interior of the left side part 36. The toothed quadrant has quite a high thickness, e.g., a material thickness of about 5 mm, and is additionally reinforced by a toothed added portion of about 4 mm thick. High strength is thus achieved.

In the motor-driven alternative, the pinion is connected to a second electric motor 60, which is also disposed at least in parts in the trough-shaped interior of the left profile part 36. What matters is that both in the manual and in the motor-driven alternative toothed quadrant and pinion, and also the pinion bearing in the side part 36, remain the same. The height adjustment of the side parts 36, 38 is stopped on one side, on the seat side that is turned away from the buckle only, that is, on the left seat side in the exemplary embodiment. Through the rear tie bar 42, which is configured to have the appropriate strength, the adjustment is transmitted to the passive right seat side. This allows for saving driving devices 58 on the right seat side.

In the manual implementation, the seat back 50 is stopped through the seat back mountings 48. Again, the stopping mechanism is only provided on the left seat side. In the motor-driven alternative, which also only works unilaterally on the left seat side, there is provided a third electric motor 62 that is located in front of the left leg of the U-profile and on the inner side of the left side cheek; it extends toward the top. The drive occurs as known from prior art.

The height of the seat front edge is adjusted relative to the side parts 36, 38. The advantage thereof is that the corresponding adjustment mechanism needs not be devised for receiving all the forces generated in the event of an accident. The forces generated in the event of an accident are introduced into the longitudinal guide through pivotal supports 32, 34. The height adjustment of the seat front edge, meaning the NV-adjustment device 40, may thus be obviated without having to change the construction of the side parts 36, 38 and of the pivotal supports 32, 34. As a result, the variants are very easy to realize in terms of construction. Concretely, the NV-adjustment device 40 has a front bridge 64 which simultaneously forms the seat front edge and is substantially built from a tube portion and two lateral rocker arms. These two rocker arms are hinge-linked at an articulation point 66 at the front on the side parts 36, 38. The pivot position of the lateral rocker arms may be adjusted in an actually known manner through an adjusting gearing with handle 68.

In the motor-driven version, there is provided a fourth electric motor 70 that is disposed in front of the first electric motor 46 and in proximity thereto. Here again, the adjustment only occurs on the seat side that is turned away from the belt buckle 28, in the present case on the left seat side. The right seat side is adjusted passively at the same time.

Figure 3:
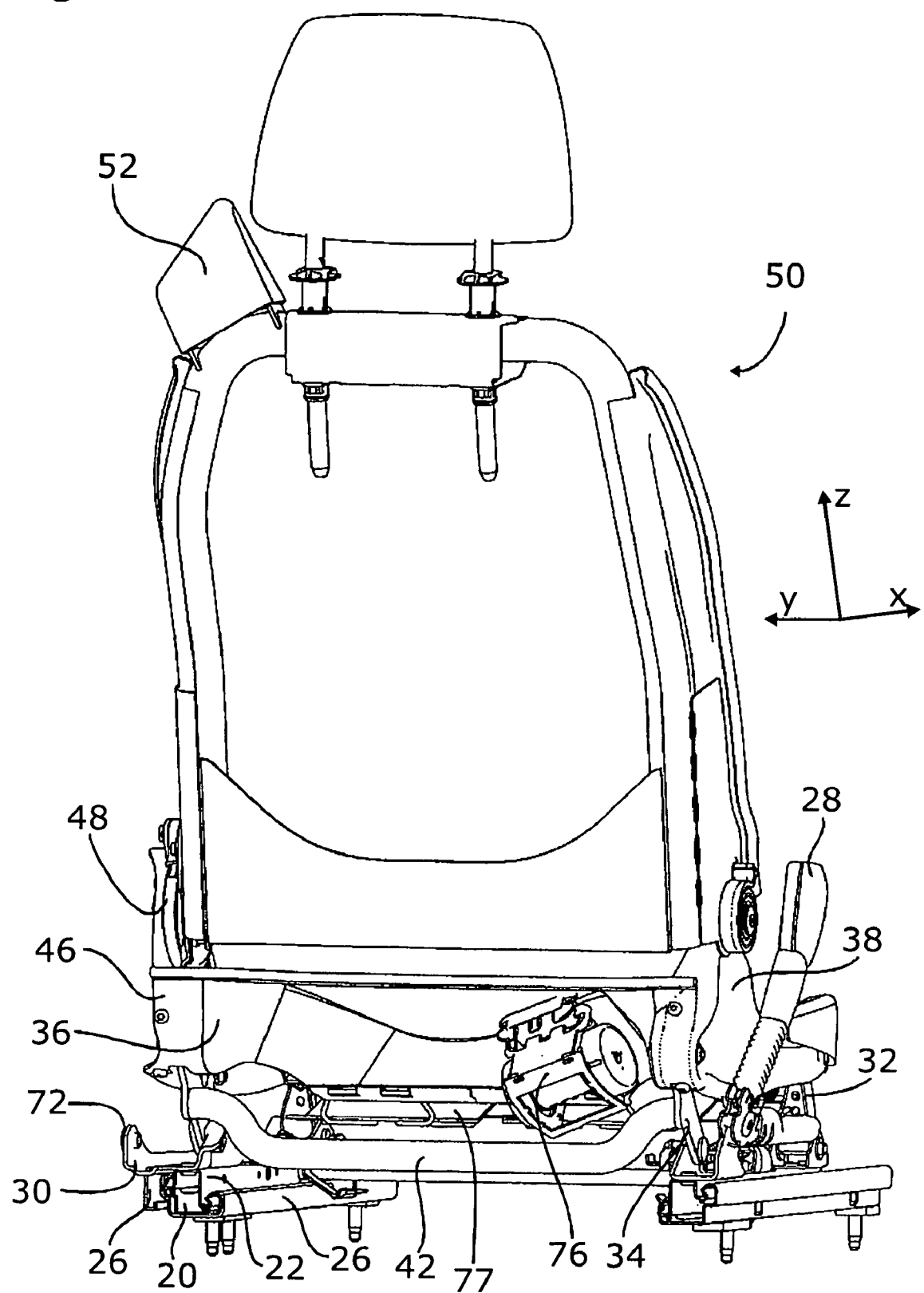
FIG. 3 is a perspective illustration of the seat, viewed slightly slantways from the back.

At the back of the left seat rail 22 there is provided a fastening point 72 for an end of a safety belt 74. From there, the safety belt 74 extends onto the other, right seat side toward the belt buckle 28 to form the lap belt and from there toward the belt deviation 52 to form the upper belt portion. From this belt deviation, it extends inside the seat back 50 downward toward a retractor 76 (see e.g., FIG. 3) which is substantially disposed above the rear tie bar 42 in the embodiment shown.

To increase their strength, the front pivotal supports 32 are U-shaped; their profile is open in the negative x direction. In order to increase the strength of the left front pivotal support 32, which is particularly stressed in the event of an accident, the profile may also have a box shape, meaning the U-profile may also be closed. To increase the rigidity, there may be further provided a front tie bar 84 that is fastened approximately in the center of the front pivotal support and joins the two pivotal supports together. The rear pivotal supports 34 are substantially flat sheet metal parts, which however are made from sufficient thick a material. For strength reasons, it may be necessary to also configure the left rear pivotal support 34 in the shape of a U-profile, as this may be seen in FIG. 5.

In the following, those features of the other exemplary embodiments will be discussed that differ from the description given herein above and which, although referring to the first exemplary embodiment, is to be understood in a general sense. In the second exemplary embodiment shown in the FIGS. 4 and 5, the retractor is disposed beneath a seat shell 77, approximately in the center thereof. It is located approximately on the level of the longitudinal guide. It is connected to the right side part 38 through a hinged tie bar 78, approximately in the region of the upper articulation point 66 of the front, right-hand side pivotal support 32. An NV-adjustment device 40 is not provided for. The two side parts 36, 38 are joined together through a front bridge 86. It forms the structure for the front seat edge. The left tie bar 42 extends in the connecting line of the upper pivot points of the rear pivotal supports 34. A torsion spring acting to lift the seat is substantially accommodated in this tie bar 42.

Figure 6:
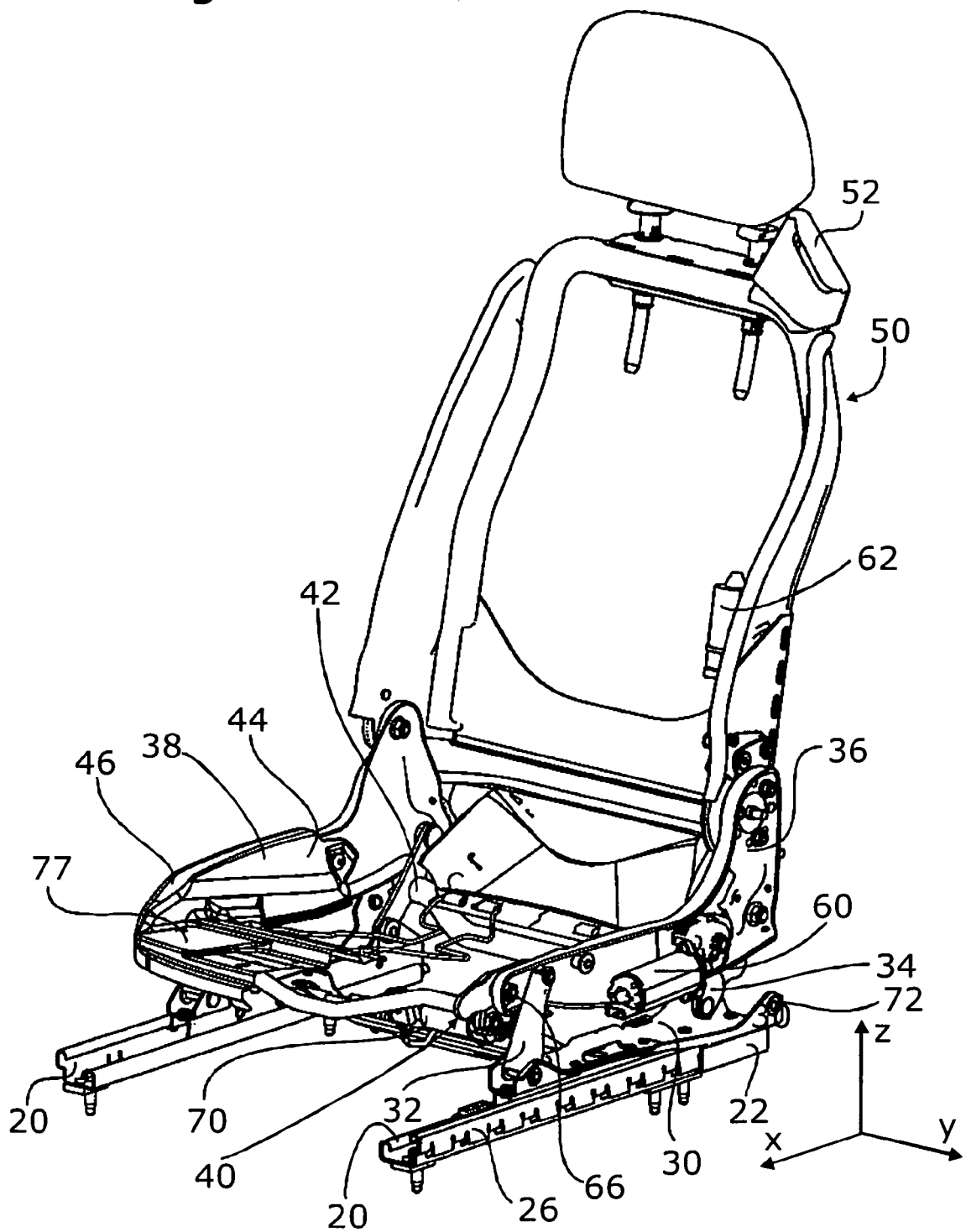
FIG. 6 is a view like FIG. 1, with the seat now being electric.
Figure 7:
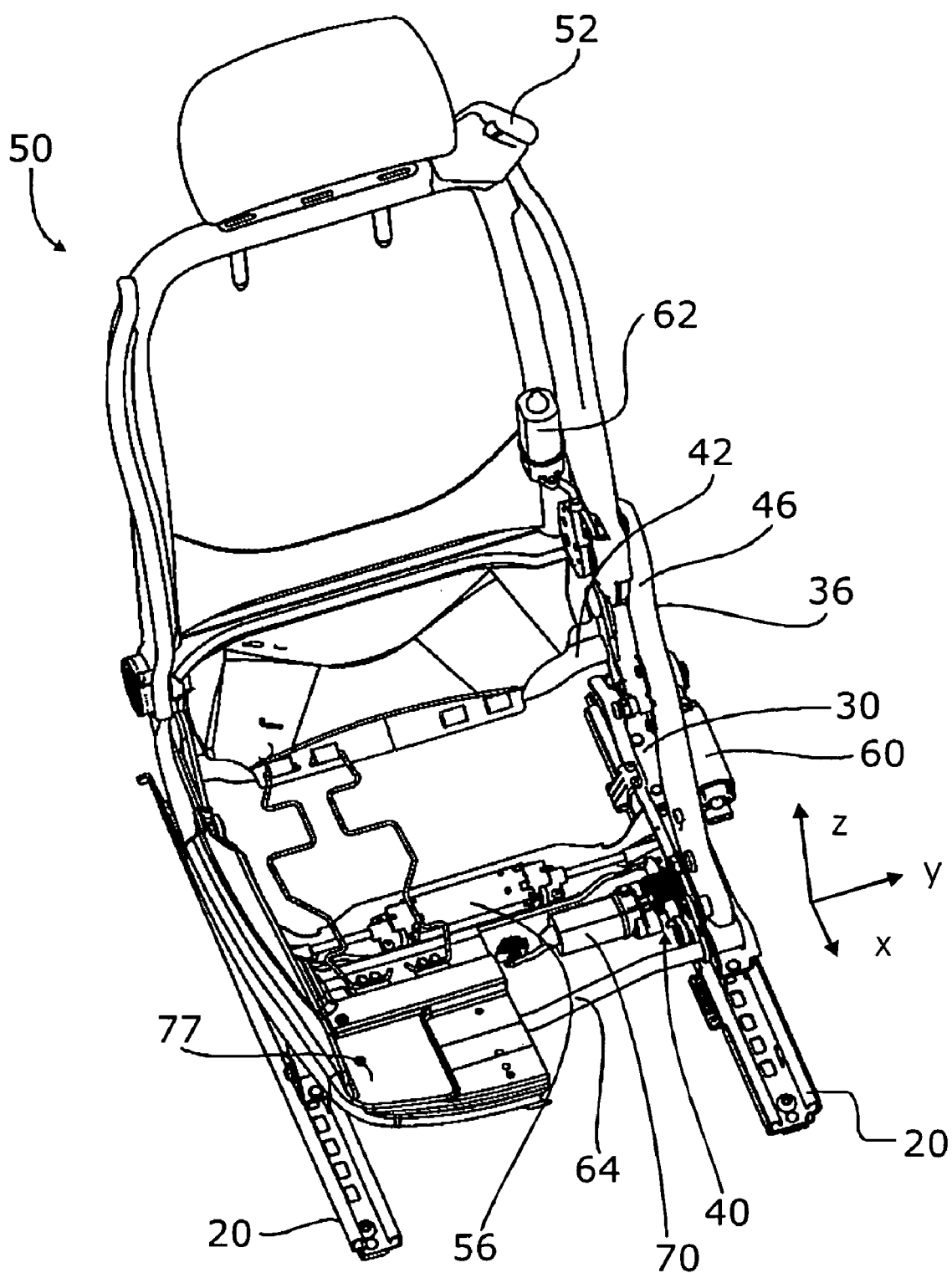
FIG. 7 is a view like FIG. 2 of the seat shown in FIG. 6.
Figure 8:
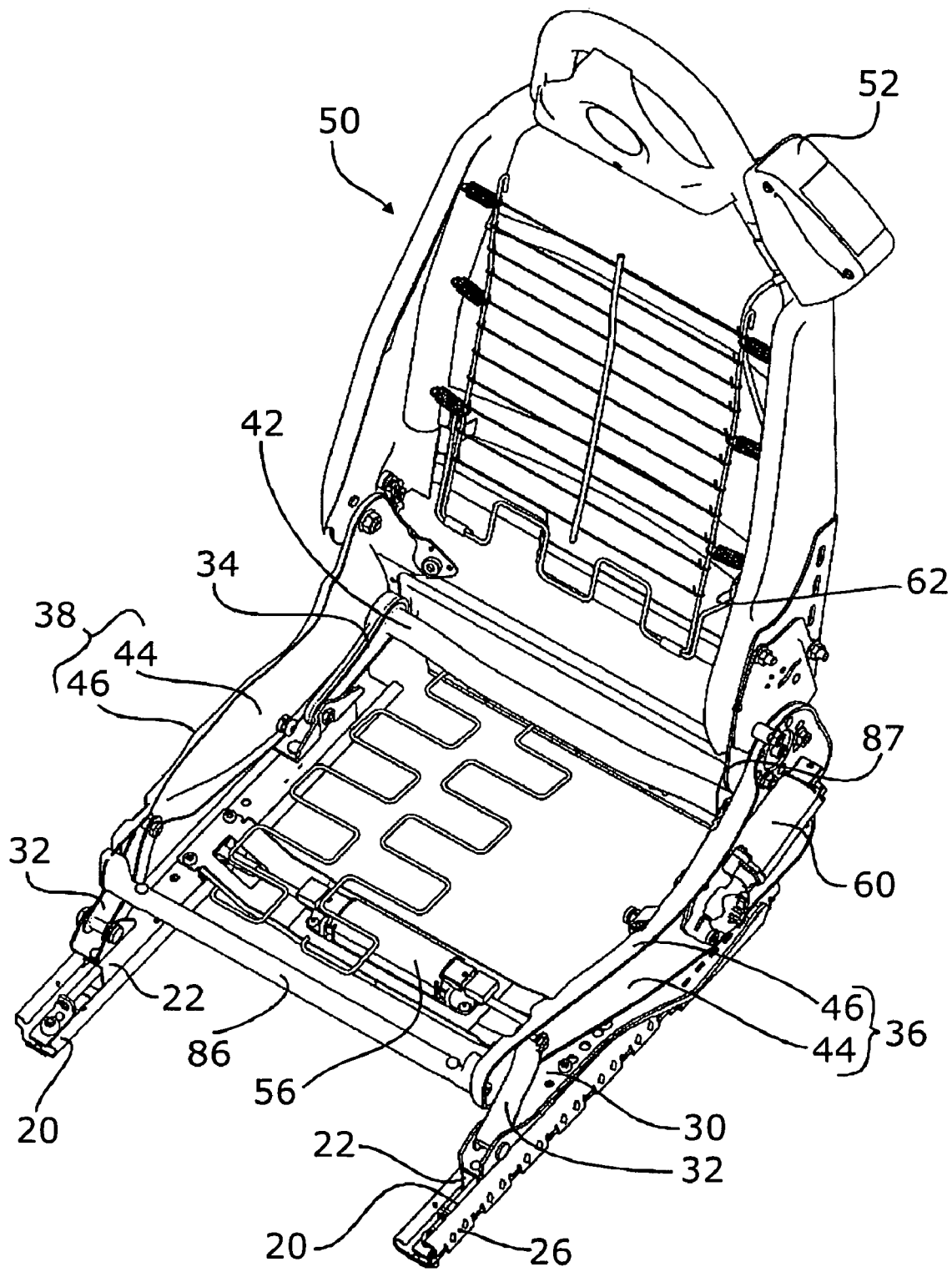
FIG. 8 is an illustration like FIG. 1 of a fourth exemplary embodiment that is also electric.

The third exemplary embodiment shown in the FIGS. 6 through 8 substantially corresponds to the first exemplary embodiment, except for the fact that the seat is now motor-driven.

Figure 4:
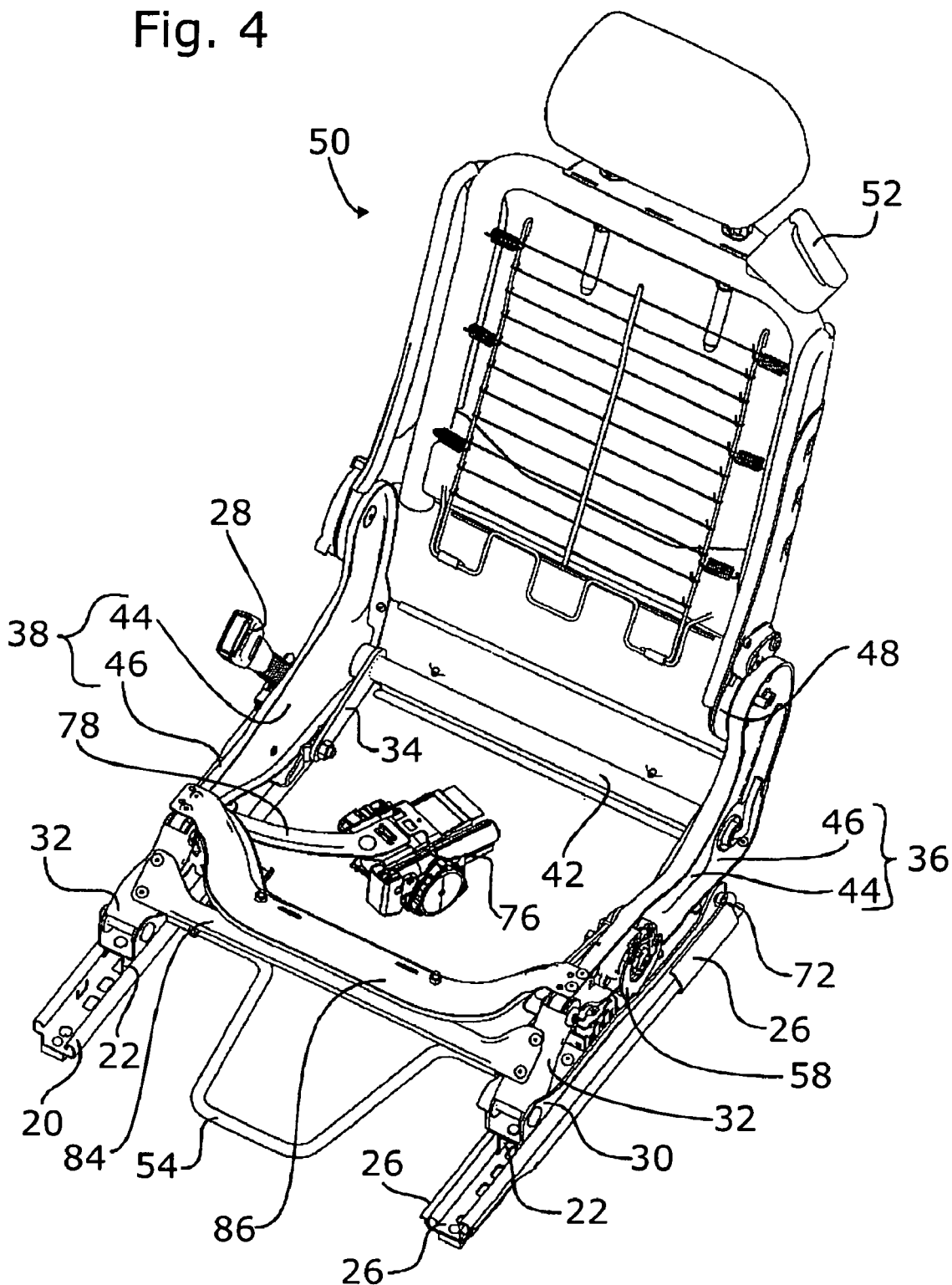
FIG. 4 is a view like FIG. 1 of a second exemplary embodiment.
Figure 5:
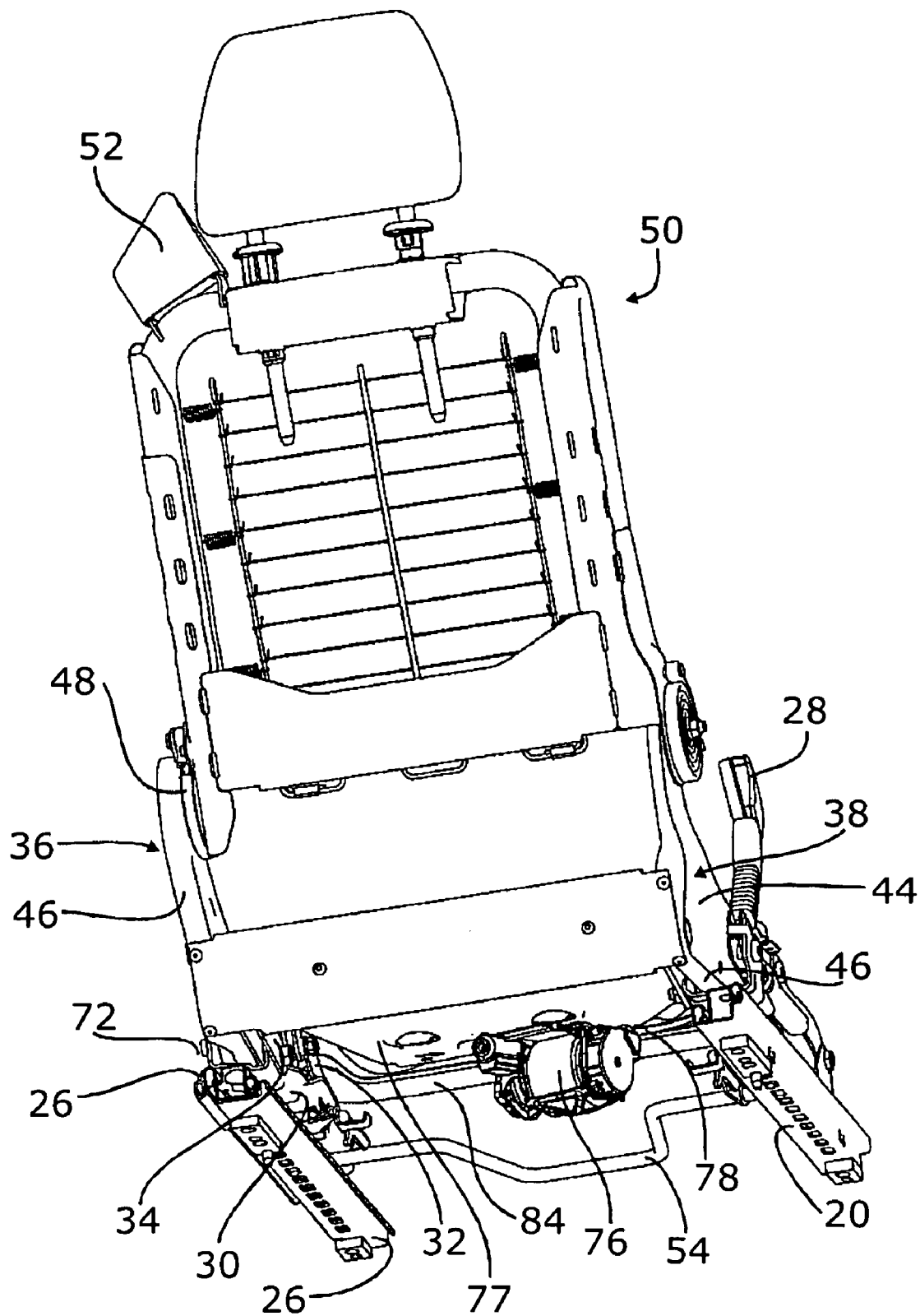
FIG. 5 is an oblique bottom view from the bottom of the seat shown in FIG. 5.

In the fourth exemplary embodiment shown in FIG. 8, there is shown a motor-driven seat that is similar to the mechanical seat shown in the FIGS. 4 and 5, meaning to the second exemplary embodiment. No seat shell 77 is provided for. The rear tie bar 42 is slightly cranked. The electric configuration of the longitudinal adjustment by means of the first electric motor 56, of the height adjustment by means of the second electric motor 60 and the seat back adjustment by means of the third electric motor 62 largely coincides with the third exemplary embodiment. The two side parts 38 are joined at the front by the front bridge 86, which simultaneously forms the front edge of the seat pan. No recline adjustment is provided for. The left front pivotal support 32 has a U-profile that is open toward the back whilst the right front pivotal support 32 has a U-profile that is open toward the front.

Figure 9:
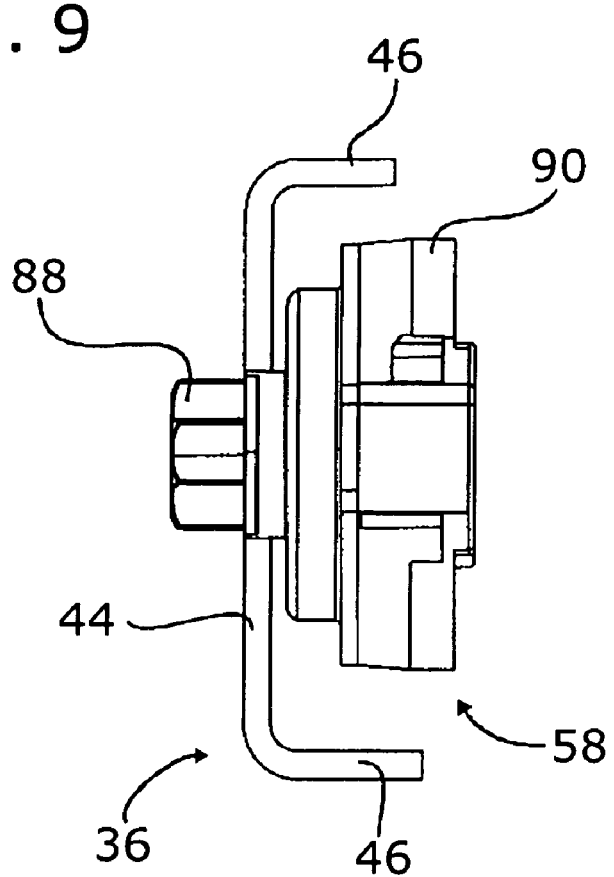
FIG. 9 is a sectional view in the yz plane through a left side part in a manual implementation and through the pinion.
Figure 10:
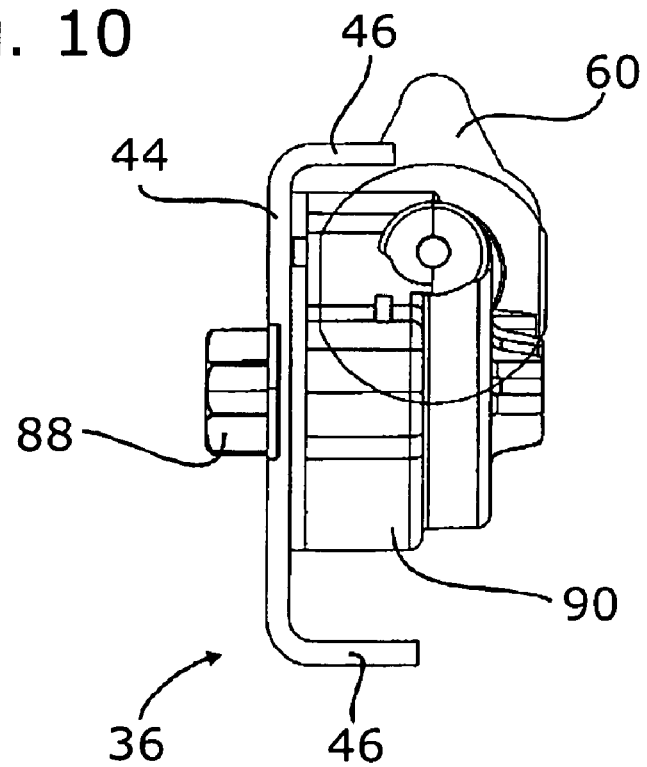
FIG. 10 is a sectional view like FIG. 1, but now in a motor-driven implementation.

The FIGS. 9 and 10 show examples of how to arrange parts of the adjustment device for the seat height. A sectional view through the left side part 36 in the region of a pinion 88 is shown. The bottom 44 of the side part 38 and the profile rim 46 are visible. In its bottom part, the profile rim 46 projects further than in its top part, which conforms to the upper rim of the bottom 44. The difference is at least 2, preferably at least 5 mm. This allows for saving space in the upper portion of the side part 38. The same applies to the other side part. The pinion 88 is carried in the side part 38. It is connected to a gearing 90 of the driving device 58, which is configured according to prior art to be a silent ratchet for example. A hand lever for actuation is not shown.

FIG. 10 shows the motor-driven equivalent. It can be seen that the side part 36 and the pinion 88 are built identically to the manual implementation. Another gearing with electric motor 60 is now provided. This gearing fits even better in the trough-shaped space than the gearing 90 shown in FIG. 9. The electric motor 60 is also accommodated inside the trough for its major part.

A major benefit of the integrated seat described is its modularity. The manual driving devices 58 can be replaced by the electric ones without having to make significant changes in terms of construction; this has been described herein above. Accordingly, the hand wheel for the manual seat back adjustment may be replaced by the electric drive by means of the third electric motor 62. The same applies to the other adjustment devices.

What is claimed is:

1. An integrated car seat with a lengthwise adjustment mechanism comprising two pairs of rails; a bottom support frame having two front pivotal supports, two rear pivotal supports and first and second side parts respectively located on first and second sides of the seat and carried on the pivotal supports; a seat back connected to the side parts by a seat back joint; a driving device; and a seat belt buckle located on the first side of the seat attached to the lengthwise adjustment mechanism, wherein the second side part is configured in the shape of a shell and defines a bottom and a perimeter profile rim, the perimeter profile rim having a free end, the free end pointing in a y-direction toward an outside of the seat, the second side part is open in the y-direction toward the outside, and the driving device is arranged on the outside of the bottom of the second side part and protrudes from the bottom in the same direction as the perimeter profile rim.

2. The integrated car seat as set forth in claim 1, wherein at least one of first side part, the second side part, and the first and second side parts has an uneven formed bottom that is deformed at least five millimeters with respect to a surface in which the bottom merges into the profile rim.

3. The integrated car seat as set forth in claim 1, wherein the rear pivotal supports are located between the two side parts.

4. The integrated car seat as set forth in claim 3, wherein at least one of the front pivotal support, the rear pivotal support and the front and rear pivotal supports, of either seat side are configured differently.

5. The integrated car seat as set forth in claim 1, wherein the front pivotal support on the first side of the seat is hinged to an inner side of the first side part and the front pivotal support located on the second side of the seat is hinged to an outer side of the second side part.

6. The integrated car seat as set forth in claim 1, wherein an adjustable seat back joint mountings is provided only on the second side part.

7. The integrated car seat as set forth in claim 1, wherein a seat back joint mountings is disposed on either seat side and that the seat back joint mountings on the second seat side is devised for torques and, as a result thereof, for stopping loads, that are at least 50% higher than those the seat back mountings on the first seat side is able to take.

8. The integrated car seat as set forth in claim 1, wherein the two pairs of rails are configured identically and that the pair of rails located on the second side of the seat is reinforced by additional profiles.

9. The integrated car seat as set forth in claim 1, further comprising a seat shell, a rear tie bar and a retractor, wherein the retractor is disposed above the rear tie bar.

10. The integrated car seat as set forth in claim 1, wherein at least one of the pivotal supports has a U-profile and that the U-profile is open in a positive x direction.

11. The integrated car seat as set forth in claim 1, wherein at least one of the rear pivotal supports is connected to a toothed quadrant, and a pinion that meshes with teeth of the toothed quadrant is carried in one of the side parts and is connected either to an electric drive or to a manual drive.

12. The integrated car seat as set forth in claim 1, further comprising a seat shell that is hinge-linked in its back region to the side parts and is connected in its front region to the side parts through a seat tilting adjustment device.

13. The integrated car seat as set forth in claim 1, wherein each pair of rails has a bottom rail and a seat rail and that at least one seat rail is connected to a console located above the seat rail and to which there is respectively hinge-linked the front and the rear pivotal support.

14. The integrated car seat as set forth in claim 1, wherein the profile rim is wider in its lower rim portion than in its upper rim portion, the difference being at least two mm.

15. The integrated car seat as set forth in claim 1, wherein the second side part has an increased strength over the first side part, the difference being at least 50%.

16. The integrated car seat as set forth in claim 1, wherein between the rear pivotal supports and a neighboring perimeter profile rim of the first side part, there is an air gap, the air gap being as small as possible such that the rear pivotal supports and profile rim are as close together as possible without contacting.

17. The integrated car seat as set forth in claim 1, wherein the second side part is open toward the outboard side of the seat.

18. The integrated car seat as set forth in claim 1, wherein a seat back joint mountings is disposed on either seat side and that the seat back joint mountings on the second seat side is devised for torques and, as a result thereof, for stopping loads, that are at least 100% higher than those the seat back mountings on the first seat side is able to take.

19. The integrated car seat as set forth in claim 1, wherein the two pairs of rails are configured identically and that the pair of rails located on the second side of the seat is reinforced by additional profiles which, in normal operation, are hooked together without contact and only interlock in the event of an accident.

20. The integrated car seat as set forth in claim 1, wherein a retractor is disposed beneath a seat shell.

21. The integrated car seat as set forth in claim 1, wherein at least one pivotal support has a U-profile and that the U-profile is open in a negative x direction.

22. The integrated car seat as set forth in claim 1, wherein the rear pivotal support located toward the second side of the seat is connected to a toothed quadrant, and a pinion that meshes with teeth of the toothed quadrant is carried in one of the side parts and is connected either to an electric drive or to a manual drive.

23. The integrated car seat as set forth in claim 1, wherein each pair of rails has a bottom rail and a seat rail and that the seat rail located on the second seat side is connected to a console located above the seat rail and to which there is respectively hinge-linked the front and the rear pivotal support.

24. The integrated car seat as set forth in claim 1, wherein the profile rim is wider in its lower rim portion than in its upper rim portion, the difference being at about 5 mm.

25. The integrated car seat as set forth in claim 1, wherein the second side part has an increased strength over the first side part, the difference being at least 100%.

26. The integrated car seat as set forth in claim 1, wherein between the rear pivotal supports and a neighboring perimeter profile rim of the first side part, there is an air gap that is as small as possible such that the rear pivotal supports and profile rim are as close together as possible without contacting, and that the rear pivotal supports are flat metal sheet parts.

27. The integrated car seat as set forth in claim 1, wherein the bottom of the second side part is shaped to form a space for the driving device.

\* \* \* \* \*